US012768711B2

(12) United States Patent
Harutyunyan et al.

(10) Patent No.: US 12,768,711 B2
(45) Date of Patent: Oct. 20, 2026

(54) VIBRATION SENSORS AND METHODS THEREOF

(71) Applicants: Honda Motor Co., Ltd., Tokyo (JP); The Board of Trustees of the Leland Stanford Junior University, Stanford, CA (US)

(72) Inventors: Avetik Harutyunyan, Santa Clara, CA (US); Xufan Li, Fremont, CA (US); Zhenan Bao, Stanford, CA (US); Chengyi Xu, Fremont, CA (US)

(73) Assignee: Honda Motor Co., Ltd., Tokyo (JP)

( * ) Notice: Subject to any disclaimer, the term of this patent is extended or adjusted under 35 U.S.C. 154(b) by 329 days.

(21) Appl. No.: 18/614,052

(22) Filed: Mar. 22, 2024

(65) Prior Publication Data

US 2025/0297888 A1 Sep. 25, 2025

(51) Int. Cl.

| | |
|---|---|
| ***G01H 11/06*** | (2006.01) |
| ***B82B 1/00*** | (2006.01) |
| ***B82B 3/00*** | (2006.01) |
| ***B82Y 15/00*** | (2011.01) |

(52) U.S. Cl.
CPC ............. *G01H 11/06* (2013.01); *B82B 1/002* (2013.01); *B82B 3/0014* (2013.01); *B82Y 15/00* (2013.01)

(58) Field of Classification Search
USPC ............................................................ 73/649
See application file for complete search history.

(56) References Cited

U.S. PATENT DOCUMENTS 11,519,068 B2 12/2022 Harutyunyan et al.

FOREIGN PATENT DOCUMENTS

DE 102015205412 A1 * 9/2016 ............ G01M 13/04
DE 102015205412 B4 * 9/2023 ............ G01M 13/04

OTHER PUBLICATIONS

Amjadi, M., et al., Stretchable, Skin-Mountable, and Wearable Strain Sensors and Their Potential Applications: A Review, Adv. Funct. Mater. 2016, 26, 1678-1698.
An, C., et al., The Opposite Anisotropic Piezoresistive Effect of ReS2, Nano 2019, 13, 3310-3319.
Biccai, S., et al., Negative Gauge Factor Piezoresistive Composites Based on Polymers Filled with MoS2 Nanosheets, ACS Nano 2019, 13, 6845-6855.
Feng, W., et al., Sensitive Electronic-Skin Strain Sensor Array Based on the Patterned Two-Dimensional a-In2—Se3, Chem. Mater. 2016, 28, 4278-4283.
Fiorillo, A. S., et al., Theory, technology and applications of piezoresistive sensors: A review, Sens. Actuators A: Phys. 2018, 281, 156-175.

(Continued)

*Primary Examiner* — Walter L Lindsay, Jr.
*Assistant Examiner* — Warren K Fenwick
(74) *Attorney, Agent, or Firm* — Patterson + Sheridan, LLP

(57) ABSTRACT

Aspects of the present disclosure generally relate to vibration sensors. The vibration sensors can include a vibration sensor including at least an aperture. A polymer including a n elastomer is disposed on the frame. A nanoribbon network is disposed on the polymer. Two or more electrodes are disposed on the nanoribbon network. The two or more electrodes have a spacing of about 500 nm to about 2000 μm.

20 Claims, 10 Drawing Sheets

(56) References Cited

OTHER PUBLICATIONS

Gao, Y., et al., Highly sensitive strain sensors based on fragmentized carbon nanotube/polydimethylsiloxane composites, Nanotechnology 2018, 29, 235501.
Irani, F. S., et al., Graphene as a Piezoresistive Material in Strain Sensing Applications, Micromachines 2022, 13, 119.
Jia, Y., et al., Multifunctional stretchable strain sensor based on polydopamine/ reduced graphene oxide/ electrospun hermoplastic polyurethane fibrous mats for human motion detection and environment monitoring, Compos. Part B Eng. 2020, 183, 107696.
Li, X., et al., Nickel particle-enabled width-controlled growth of bilayer molybdenum disulfide nanoribbons, Sci. Adv. 2021, 7, eabk1892.
Ma, R., et al., Extraordinarily High Conductivity of Stretchable Fibers of Polyurethane and Silver Nanoflowers, ACS Nano 2015, 9, 10876-10886.
Manzeli, S., et al., Piezoresistivity and Strain-induced Band Gap Tuning in Atomically Thin MoS2, Nano Lett. 2015, 15, 5330-5335.
Neri, I., et al., Electronic transport modulation on suspended few-layer MoS2 under strain, Phys. Rev. B 2018, 97, 241408.
Pu, J.-H., et al., 2D end-to-end carbon nanotube conductive networks in polymer nanocomposites: a conceptual design to dramatically enhance the sensitivities of strain sensors, Nanoscale 2018, 10, 2191-2198.
Tsai, M.-Y., et al., , Flexible MoS2 Field-Effect Transistors for Gate-Tunable Piezoresistive Strain SensorsACS Appl. Mater. Interfaces 2015, 7, 12850-12855.
Wagner, S., et al., Highly Sensitive Electromechanical Piezoresistive Pressure Sensors Based on Large-Area Layered PtSe2 Films, Nano Lett. 2018, 18, 3738-3745.
Wang, C., et al., Synthesis of atomically thin GaSe wrinkles for strain sensors, Front. Phys. 2016, 11(2), 116802.
Yan, W., et al., Giant gauge factor of Van der Waals material based strain sensors, Nat. Commun. 2021, 12, 2018.
Yang, S., et al., Sensitivity-Tunable Strain Sensors Based on Carbon Nanotube@Carbon Nanocoil Hybrid Networks, ACS Appl. Mater. Interfaces 2019, 11, 38160-38168.
Zhao, S., et al., Percolation threshold-inspired design of hierarchical multiscale hybrid architectures based on carbon nanotubes and silver nanoparticles for stretchable and printable electronics, J. Mater. Chem. C 2016, 4, 6666.

* cited by examiner

VIBRATION SENSORS AND METHODS THEREOF

FIELD

Aspects of the present disclosure generally relate to vibration sensors and methods of use.

BACKGROUND

Vibration sensors play important roles in physiological signal detection, especially for the human respiratory system, which can include detection of breath, voice, and lung sound. Conventional respiratory devices for monitoring respiratory activities, e.g., lung sound, breath, and vocal signals, include a plurality of vibration sensors, in which each vibration sensor of the plurality of vibration sensor comprises a different sensitivity and a different range of detected frequencies, e.g., breath (0.2-0.5 Hz), voice (80-250 Hz), and lung sound (60-3000 Hz). Moreover, many of these vibration sensors are bulky, rigid, and have limited form factors, which largely limit the implementation in human-interfacing applications requiring seamless integration, safer interaction, improved signal quality, and continuous long-term recording.

Recently, low-dimensional materials such as carbon nanotubes (CNTs), metal nanowires, and 2D materials, e.g., graphene and transition metal dichalcogenides (TMDs) have been emerging as potential candidates for vibration sensors. Among these, conductive networks and/or films made of CNTs, metal nanowires, and graphene can provide enhanced electrical performance compared to conventional vibration sensors. However, these conductive networks and/or films generally are gapless, are not intrinsically piezo-responsive, and require contact functions between wires and/or layers to transmit signals, thereby resulting in low sensitivities to small mechanical stimuli. TMDs, as exemplified by single atomic layer $MoS_2$ films, possess intrinsic piezoresistive and piezoelectric response due to their unique lattice and band structures, which are in principle suitable for vibration sensing. However, conventional $MoS_2$ films suffer from structural non-uniformity and poor mechanical robustness over repeated deformation, e.g., stretching and bending).

There is a need for new vibration sensors and methods thereof.

SUMMARY

Aspects of the present disclosure can include vibration sensors. The vibration sensors can include a vibration sensor including at least an aperture. A polymer including an elastomer is disposed on the frame. An assembly of nanoribbon that forms a network, e.g., a nanoribbon network, is disposed on the polymer. Two or more electrodes are disposed on the nanoribbon. The two or more electrodes have a spacing of about 500 nm to about 2000 μm.

Aspects of the present disclosure can also include methods of producing vibration sensors. The methods can include growing a nanoribbon network on a substrate selected from the group consisting of $SiO_2$, Si, Au, c-sapphire, fluorophlogopite mica (F-mica), $SrTiO_3$, hexagonal boron nitride (h-BN), and combinations thereof. A film is formed by depositing a polymer on the nanoribbon network. The film is disposed on a frame. Two or more electrodes are disposed on the film.

Aspects of the present disclosure can also include methods of detecting frequencies. The methods can include measuring a first current of a vibration sensor. The vibration sensor can include a frame including at least an aperture. A film including a nanoribbon network disposed on a polymer. The polymer being disposed on the frame. Two or more electrodes disposed on the nanoribbon network. The film of the vibration sensor is bent from a first length to a second length. A second current of the vibration sensor is measured.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

FIG. 1A is a schematic, cross-sectional view of a vibration sensor. FIG. 1B is a schematic top view of a lateral ribbon-ribbon junction. FIG. 1C is a schematic top view of a stacking ribbon-ribbon junction.

FIG. 3A is a schematic cross-sectional view showing a nanoribbon network grown on a substrate. FIG. 3B is a schematic cross-sectional view showing a film disposed on the substrate with the as-grown nanoribbon network. FIG. 3C is a schematic cross-sectional view showing a film lift. FIG. 3D is a schematic cross-sectional view showing a film disposed on a frame. FIG. 3E is a schematic cross-sectional view showing a film disposed on a frame and electrodes disposed on the film.

FIG. 4A is a flat state of a vibration sensor operating in a contact mode. FIG. 4B is a bent state of a vibration sensor operating in a contact mode. FIG. 4C is a flat state of a vibration sensor operating in a non-contact mode.

FIG. 6A is an image of a low density nanoribbon network. FIG. 6B is an image of a medium density nanoribbon network. FIG. 6C is an image of a high density nanoribbon network.

FIG. 10A shows frequency time domain results for a 1 Hz vibration sensed by the vibration sensor. FIG. 10B shows a frequency time domain results for a 100 Hz vibration sensed by the vibration sensor.

DETAILED DESCRIPTION

Aspects of the present disclosure generally relate to vibration sensors and methods thereof. The present disclosure provides vibration sensors having a nanoribbon network, e.g., an atomically thin $MoS_2$ nanoribbon network, that is disposed between a plurality of electrodes and a polymer, allowing for continuous piezoresistive measurements to be obtained between the plurality of electrodes. The nanoribbon is disposed on the polymer to provide increased robustness and conformality to provide long-term sensing with bending-unbending cycles of the nanoribbon upon vibration. In some aspects, a vibration sensor of the present disclosure can provide a gauge factor of up to about 2000 with less than 5% strain, providing enhanced sensitivity compared to conventional vibration sensors.

Vibration Sensor

Figure 1A:
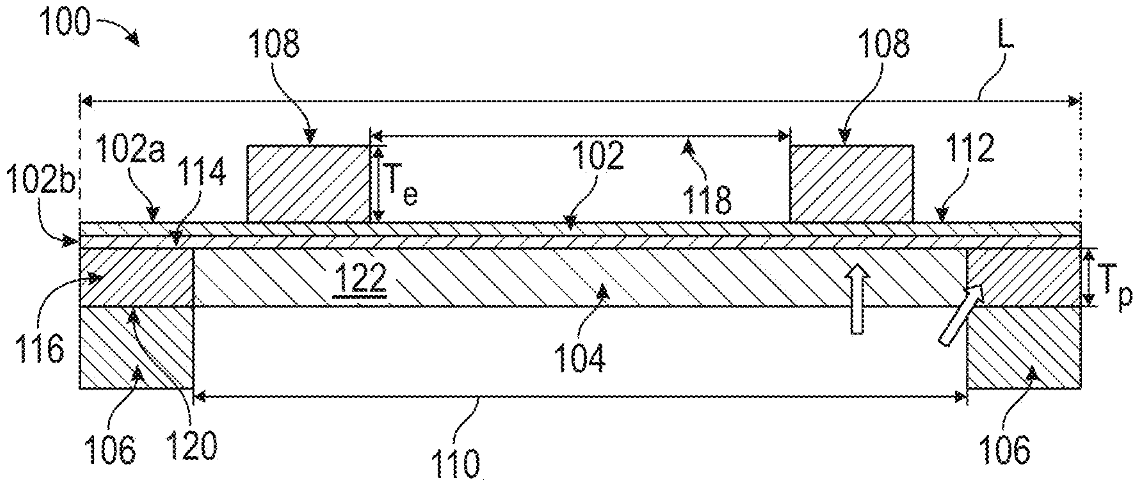
FIGS. 1A-1C are schematics of a vibration sensor according to at least one aspect of the present disclosure.

FIG. 1A shows a schematic, cross-sectional view of a vibration sensor 100. The vibration sensor 100 includes a nanoribbon network 102. As used herein, the term "ribbon" refers to an elongated structure, that is, a structure with a length-to-width ratio of greater than 500, optionally greater than 1000. As used herein, the term "nanoribbon" refers to a ribbon with at least one dimension on the nanoscale, for example, a ribbon having a width of between about 1 and 100 nm, e.g., about 1 nm to about 10 nm, about 10 nm to about 20 nm, about 20 nm to about 30 nm, about 30 nm to about 40 nm, about 40 nm to about 50 nm, about 50 nm to about 60 nm, about 60 nm to about 70 nm, about 70 nm to about 80 nm, about 80 nm to about 90 nm, or about 90 nm to about 100 nm. As a further example, the nanoribbon can include a height of about 0.1 nm to about 5 nm, e.g., about 0.1 nm to about 1 nm, about 1 nm to about 2 nm, about 2 nm to about 3 nm, about 3 nm to about 4 nm, or about 4 nm to about 5 nm.

Figure 1B:
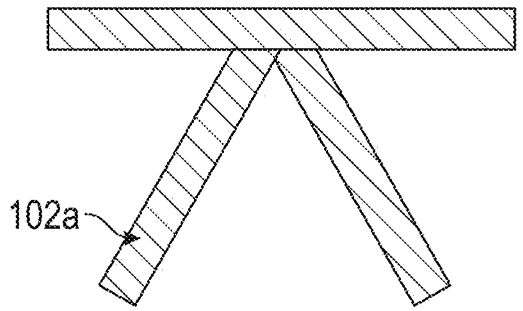
Figure 1C:
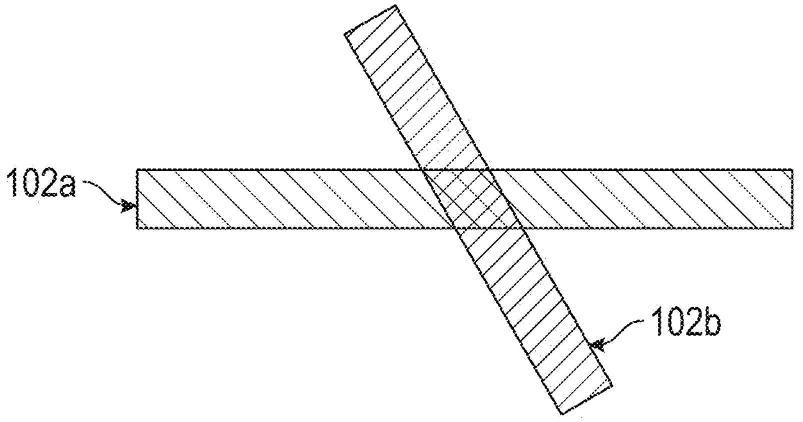

The nanoribbon network 102 can include a first monolayer 102*a*. In some aspects, the first monolayer 102*a* can include a single atomic layer of a transition metal dichalcogenide (TMD). In some aspects, the single atomic layer of a TMD can include one or more lateral ribbon-ribbon junctions. A lateral ribbon-ribbon junction can include a junction between one or more crystals of TMD along an atomic plane that merge together with the formation of grain boundaries, as shown in FIG. 1B. Without being bound by theory, a lateral ribbon-ribbon junction can increase the sensitivity of the vibration sensor 100.

In some aspects, the TMD may comprise a precursor powder, e.g., a metal from a metal powder, for example, Ni or Mg, a metal from a metal oxide powder, for example, $MoO_2$, $MoO_3$, $WO_2$, or $WO_3$, and/or a chalcogen from a chalcogen powder, in which a chalcogen includes an element in Group 16 of the periodic table such as sulfur, selenium, and/or tellurium. For example, the TMD can include $MoS_2$, $MoSe_2$, $WS_2$, $WSe_2$. As a further example, the TMD can include $MoS_2$. It should be understood that the TMD may include one or more metal elements provided by the one or more TMDs as described in U.S. Pat. No. 11,519,068, filed on Jan. 13, 2021, the entirety of which is incorporated herein.

In some aspects, the TMD may have a certain element ratio. For example, the TMD may have a mol:mol ratio of metal to chalcogen of about 0.1:1 to about 2:1, such as about 0.5:1 to about 2:1 or about 0.67:1 to about 1.5:1. In some aspects, the mol:mol ratio of metal to chalcogen may be the ratio of metal from the metal powder to chalcogen (e.g., the ratio of Ni to S), the mol:mol ratio of metal from the metal oxide powder to chalcogen (e.g., the ratio of Mo to S), or the mol:mol ratio of total metal to chalcogen (e.g., the ratio of (Ni+Mo) to S). For example, the TMD can include a mol:mol ratio of 0.5:1 of molybdenum to sulfur, e.g., $MoS_2$.

In some aspects, the TMD may have a first metal to second metal mol:mol ratio of about 0.1:1 to about 2:1, such as about 0.5:1 to about 1.5:1. For example, the first metal may include a metal from a metal powder (e.g., Ni) and the second metal may include a metal from a metal oxide powder (e.g., Mo). As a further example, the TMD may have only a metal from the metal powder.

In some aspects, the nanoribbon network 102 may include a second monolayer 102*b*. In some aspects, the second monolayer 102*b* can include a single atomic layer of a transition metal dichalcogenide (TMD), where the second monolayer 102*b* is positioned on a surface of the first monolayer 102*a*. In some aspects, the second monolayer 102*b* being disposed on a surface of the first monolayer 102*a* can create stacking ribbon-ribbon junctions, which can increase the sensitivity and/or gauge factor of the vibration sensor 100. In some aspects, the nanoribbon may include a third monolayer, a fourth monolayer, and/or a fifth monolayer disposed on the second monolayer. Without being bound by theory, by increasing the number of monolayers within the nanoribbon network 102, an increase in the sensitivity may be controlled to promote sensitivity while concurrently decrease the conformality and/or elasticity of the nanoribbon.

In some aspects, the first monolayer 102*a* have a thickness of about 0.1 nm to about 10 nm, e.g., about 0.1 nm to about 8 nm, about 0.5 nm to about 5 nm, or about 0.9 nm to about 1.1 nm. For example, the first monolayer 102 can have a thickness of about 1 nm. In some aspects, the second monolayer 102*b* may have a 0.1 nm to about 10 nm, e.g., about 0.1 nm to about 8 nm, about 0.5 nm to about 5 nm, or about 0.9 nm to about 1.1 nm. For example, the second monolayer 102 can have a thickness of about 1 nm.

In some aspects, where the nanoribbon network 102 includes a first monolayer 102*a* and a second monolayer 102*b* the nanoribbon can include a length, L, of about 1 μm and 1000 μm, e.g., about 1 μm to about 10 μm, about 10 μm to about 50 μm, about 50 μm to about 100 μm, about 100 μm to about 200 μm, about 200 μm to about 300 μm, about 300 μm to about 400 μm, about 400 μm to about 500 μm, about 500 μm to about 600 μm, about 600 μm to about 700 μm, about 700 μm to about 800 μm, about 800 μm to about 900 μm, or about 900 μm to about 1000 μm.

The nanoribbon network 102 is disposed on a polymer 104. The polymer 104 can include an elastomer, e.g., a rubber. In some aspects, the elastomer can include one or more monomers including styrene, propylene, butylene, ethylene, diisocyanate, ester, amine, siloxane or a combination thereof. For example, the elastomer can include styrene-butadiene-styrene. As a further example, the elastomer can include styrene-ethylene-butadiene-styrene elastomer. Without being bound by theory, an elastomer of styrene-ethylene-butadiene-styrene can provide increased elasticity and/or deformability of the nanoribbon network while maintaining the piezoresistive properties of the nanoribbon network 102. In some aspects, the polymer 104 includes a thickness, $T_p$, of about 100 nm to about 20 μm, e.g., about 100 nm to about 5 μm, about 200 μm to about 10 μm, about 500 μm to about 15 μm, or about 1 μm to about 20 μm.

The polymer 104 can have a specific gravity of about 0.91 to about 0.95, e.g., about 0.91 to about 0.92, about 0.92 to about 0.93, about 0.93 to about 0.94, or about 0.94 to about 0.95. The polymer can include a hardness (shore A) of about 35 to about 80, e.g., about 35 to about 40, about 40 to about 45, about 45 to about 50, about 50 to about 55, about 55 to about 60, about 60 to about 65, about 65 to about 70, about 70 to about 75, or about 75 to about 80. The polymer 104 can have a tensile strength (MPa) of about 2 MPa to about 30 MPa, e.g., about 2 MPa to about 4 MPa, about 4 MPa to about 6 MPa, about 6 MPa to about 8 MPa, about 8 MPa to about 10 MPa, about 10 MPa to about 20 MPa, or about 20 MPa to about 30 MPa. The polymer 104 can have an elastic modulus of about 100 kPa to about 20 MPa, e.g., about 100 kPa to about 18 MPa, about 500 kPa MPa to about 10 MPa, about 1 MPa to about 8 MPa, or about 5 MPa to about 17 MPa. The polymer can have an elongation % of about 200% to about 900%, e.g., about 200% to about 300%, about 300% to about 400%, about 400% to about 500%, about 500% to about 600%, about 600% to about 700%, about 700% to about 800%, or about 800% to about 900%.

The polymer 104 can be disposed on a frame 106. The frame 106 can include a support material suitable for supporting the polymer 104. For example, the frame 106 can include metal, plastic, wood, glass, ceramic, or a combination thereof. In some aspects, the frame 106 can include a width of about 1 cm to about 10 cm, e.g., about 1 cm to about 2 cm, about 2 cm to about 3 cm, about 3 cm to about 4 cm, about 4 cm to about 5 cm, about 5 cm to about 6 cm, about 6 cm to about 7 cm, about 7 cm to about 8 cm, about 8 cm to about 9 cm, or about 9 cm to about 10 cm. In some aspects, the frame 106 can include a height of about 100 μm to about 10 cm, e.g., about 1 mm to about 500 mm, about 500 mm to about 1 cm, about 1 cm to about 2 cm, about 2 cm to about 3 cm, about 3 cm to about 4 cm, about 4 cm to about 5 cm, about 5 cm to about 6 cm, about 6 cm to about 7 cm, about 7 cm to about 8 cm, about 8 cm to about 9 cm, or about 9 cm to about 10 cm.

In some aspects, the frame 106 can include an aperture 110 located within the frame 106. The aperture 110 may include a square aperture, circular aperture, polygonal aperture, triangular aperture, rectangular aperture, trapezoidal aperture, and/or rhomboidal aperture. For example, the aperture 110 can include a 1 cm by 1 cm square aperture located within the frame 106. Without being bound by theory, the aperture 110 can allow the polymer 104 and/or the nanoribbon network 102 to be suspended, and therefore bend and/or deform to a plurality of vibrations and/or frequencies.

In some aspects, two or more electrodes 108 may be disposed on a first surface 112 of the nanoribbon network 102. The first surface 112 is opposite a second surface 114 which abuts a first surface 116 of polymer 104. The two or more electrodes 108 can include a metal electrode, e.g., an electrode including one or more metals and/or metal alloys selected from groups 3-15 of the periodic table of elements. In some aspects, the two or more electrodes are each independently indium, bismuth, nickel, gold, titanium, platinum, and/or silver. For example, the two or more electrodes can each be silver electrodes.

The two or more electrodes may include a thickness, $T_e$, of about 1 nm to about 100 nm, e.g., about 1 nm to about 10 nm, about 10 nm to about 20 nm, about 20 nm to about 30 nm about 30 nm to about 40 nm, about 40 nm to about 50 nm, about 50 nm to about 60 nm, about 60 nm to about 70 nm, about 70 nm to about 80 nm, about 80 nm to about 90 nm, or about 90 nm to about 100 nm. In some aspects, the two or more electrodes may be disposed on the nanoribbon network 102 to provide a spacing 118 of about 50 μm to about 2 cm, e.g., about 50 μm to about 100 μm, about 100 μm to about 500 μm, about 500 μm to about 1 mm, about 1 mm μm to about 1 cm, or about 1 cm to about 2 cm. Without being bound by theory, a spacing can allow a vibration to bend the nanoribbon network 102 and the polymer 104 located above the aperture of the frame, producing a resistance change in the nanoribbon network 102, which can be detected by measuring the current change between the two or more electrodes, as described below.

Methods

Figure 2:
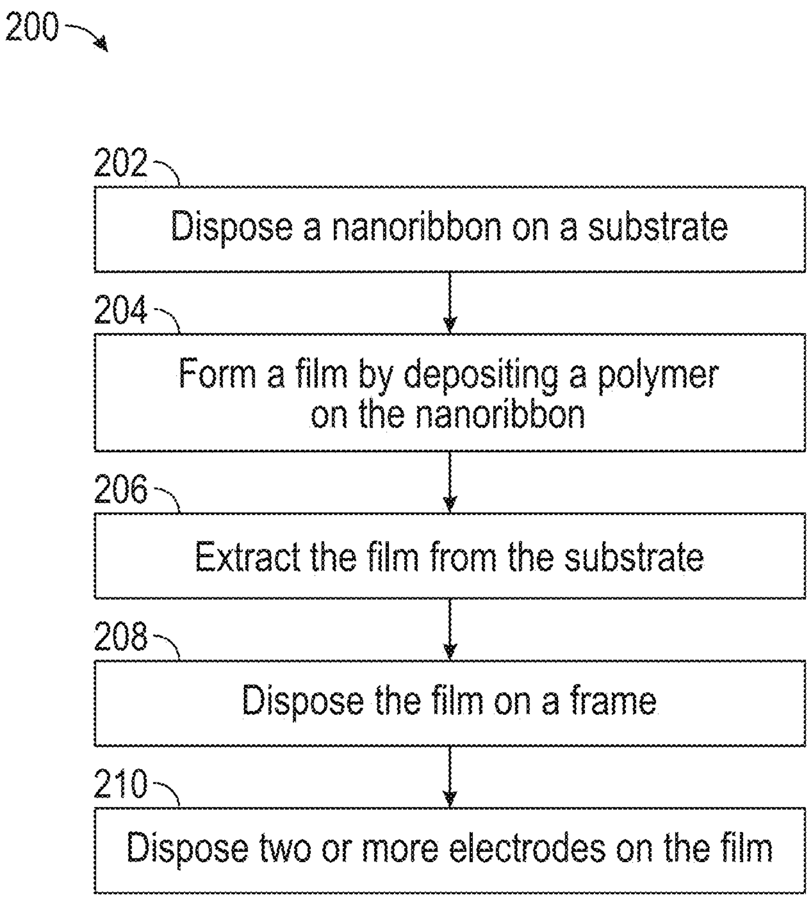
FIG. 2 is a flowchart of a method of forming a vibration sensor according to at least one aspect of the present disclosure.

FIG. 2 shows a method 200 of forming a vibration sensor 100. At operation 202, a nanoribbon network 102 is grown on a substrate 302, as shown in FIG. 3A. The nanoribbon network 102 includes any of the nanoribbon networks 102 of the present disclosure. A substrate 302 can include any inert material suitable for use for deposition of a nanoribbon network 102. For example, a substrate 302 can include $SiO_2$, Si, Au, c-sapphire, fluorophlogopite mica (F-mica), $SrTiO_3$, hexagonal boron nitride (h-BN), or combinations thereof. In some aspects, the nanoribbon network 102 can be grown on the substrate 302 by subjecting two or more precursor powders, e.g., $MoO_2$, NaBr, and/or Ni, to a moisturized gas flow at an elevated temperature, e.g., about 100° C. to about 1000° C., such as about 100° C. to about 200° C., about 200° C. to about 300° C., about 300° C. to about 400° C., about 400° C. to about 500° C., about 500° C. to about 600° C., about 600° C. to about 700° C., about 700° C. to about 800° C., about 800° C. to about 900° C., or about 900° C. to about 1000° C., to grow monolayers of a TMD on the substrate using chemical vapor deposition, where a moisturized gas includes a gas that contains a measurable concentration of acceptable moisture, e.g., about 1% to about 99% moisture. For example, the moisturized gas flow may comprise one or more inert gasses and a measurable concentration of acceptable moisture, e.g., about 1% to about 99% moisture. According to some aspects, acceptable moisture may comprise or consist of deionized (DI) water. Example inert gasses useful according to the present disclosure include, but are not limited to, argon gas (Ar), nitrogen gas (N), and combinations thereof. In some aspects, the nanoribbon network 102 can be deposited on the substrate 302 according to one or more chemical vapor deposition techniques as described in U.S. Pat. No. 11,519,068, filed on Jan. 13, 2021, the entirety of which is incorporated herein.

In some aspects, a density of the nanoribbon network 102 can be controlled, thereby controlling a number of the lateral ribbon-ribbon junctions and stacking ribbon-ribbon junctions within the nanoribbon network 102. For example, by controlling an amount of the precursor, e.g., $MoO_2$, NaBr, and/or Ni, the density of the nanoribbon network may be controlled. In some aspects, the density of the nanoribbon network 102 may be represented by the total number of nanoribbons relative to the total distance of a central portion of the film 122. In some aspects, the density of the nanoribbon network 102 can be about 10 $mm^{-1}$ to about 40 $mm^{-1}$, e.g., about 10 $mm^{-1}$ to about 35 $mm^{-1}$, about 15 $mm^{-1}$ to about 35 $mm^{-1}$, about 15 $mm^{-1}$ to about 25 $mm^{-1}$, or about 15 $mm^{-1}$ to about 20 $mm^{-1}$. At operation 204, a film 304 is formed by depositing a polymer 104 on the nanoribbon network 102, as shown in FIG. 3B. The film 304 includes the polymer 104 disposed on a surface of the nanoribbon network 102. The polymer 104 can be deposited by spin coating a polymer solution on the nanoribbon network 102. The spin coating can include spin coating at about 500 revolutions per minute (rpm) to about 3000 rpm, e.g., about 500 rpm to about 1000 rpm, about 1000 rpm to about 1500 rpm, about 1500 rpm to about 2000 rpm, about 2000 rpm to about 2500 rpm, or about 2500 rpm to about 3000 rpm. The polymer solution can include polymer components made with one or more monomers with functional parts, e.g., styrene, propylene, butylene, ethylene, diisocyanate, ester, amine, siloxane, or a combination thereof. For example, the polymer solution can include a solution made with one or more monomers that react to form a styrene-butylene-styrene oligomer. As a further example, the polymer solution can include a solution made with one or more monomers that react to form a styrene-ethylene-butylene-styrene oligomer.

The polymer solution can include about 10 mg/ml to about 300 mg/ml of the one or more polymer components, e.g., about 10 mg/ml to about 50 mg/ml, about 50 mg/ml to about 100 mg/ml, about 100 mg/ml to about 150 mg/ml, about 150 mg/ml to about 200 mg/ml, about 200 mg/ml to about 250 mg/ml, or about 250 mg/ml to about 300 mg/ml. The polymer solution can include a solvent suitable for dissolving and/or suspended the one or more polymer components. For example, the solvent can include an organic solvent such as acetone, chloroform, toluene, acetonitrile, ether, ethyl acetate, hexane, methanol, benzene, or a combination thereof. For example, the solvent can include toluene.

In some aspects, forming the film 304 can include depositing about 100 nm to about 20 μm of the polymer 104 on the nanoribbon network 102, e.g., about 100 nm to about 500 nm, about 500 nm to about 1 μm, about 1 μm to about 5 μm, about 5 μm to about 10 μm, about 10 μm to about 15 μm, or about 15 μm to about 20 μm.

Figure 3C:
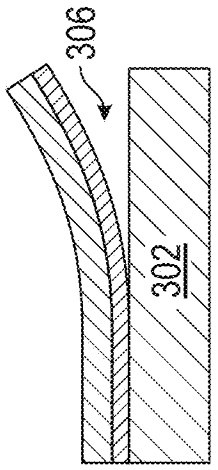
FIGS. 3A-3E are schematic cross-sectional views of a vibration sensor according to the methods of forming a vibration sensor, according to at least one aspect of the present disclosure.
Figure 3B:
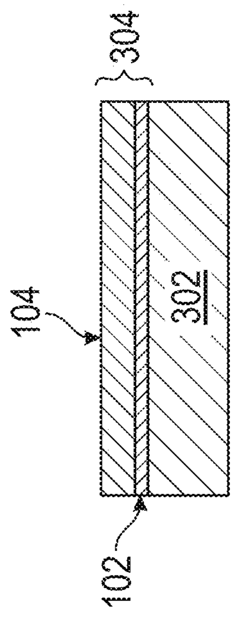
Figure 3A:
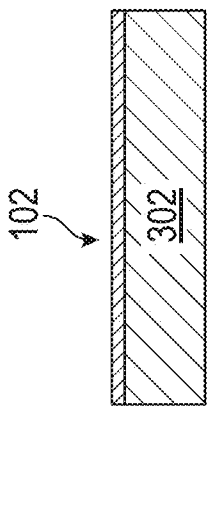

At operation 206, the film 304 is extracted from the substrate 302, as shown in FIG. 3C. The film 304 can be extracted from the substrate 302 by placing the film 304 disposed on the substrate 302 in aqueous media 306. The aqueous media 306 can include deionized water. The aqueous media 306 can extract the film 304 from the substrate 302 by flowing between the nanoribbon network 102 and the substrate 302, to lift and/or remove the film 304 from the substrate 302. Without being bound by theory, the aqueous media 306 can lift the film 304 due to the relatively weak adhesion between the nanoribbon network 102 and the substrate 302. In some aspects, the extracted film 304 may be extracted and/or removed from the substrate 304 to create a suspension of the film 304 in the aqueous media 306.

Figure 3E:
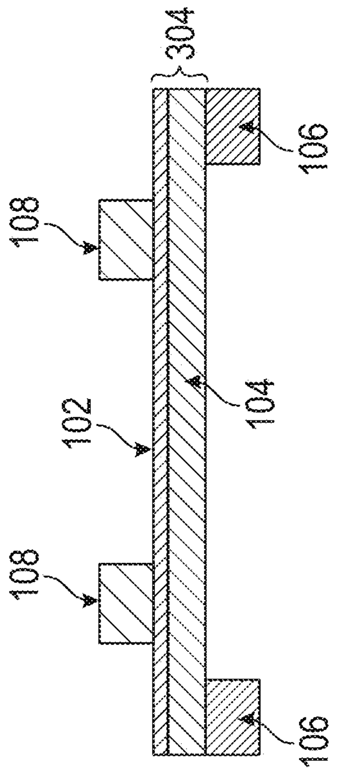
Figure 3D:
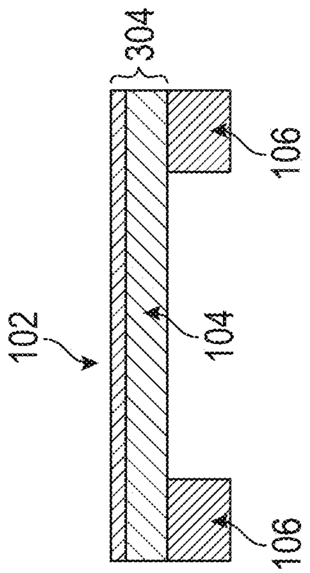

At operation 208, the film 304 is disposed on a frame 106, as shown in FIG. 3D. The frame 106 includes any of the frame 106 of the present disclosure. The film 304 may be disposed on the frame 106 such that second surface 120 of the polymer 104 is in contact with the frame 104, in which the second surface 120 of the polymer 104 is opposite the first surface 116 of the polymer, where the second surface 120 of the polymer abuts the frame 106. In some aspects, the film 304 is disposed on the frame 106 using one or more adhesive films, e.g., adhesive tape. A central portion 122 of the film 304 is disposed over an aperture of the frame 106, which can allow for deformation of the film 304, e.g., via bending and/or elongation over the aperture, as shown below in reference to FIGS. 4A-4C. In some aspects, the film 304 may be extracted from the aqueous media 306, e.g., via decantation, filtration, extraction, evaporation, or a combination thereof, in which the extracted film 304 may be disposed on the frame 106.

At operation 210, two or more electrodes 108 are disposed on a surface of the nanoribbon network 102, as shown in FIG. 3E. The two or more electrodes 108 can include any of the two or more electrodes 108 as described herein. The two or more electrodes can be disposed on the surface of the nanoribbon network 102 to provide a spacing of about 500 nm to about 2000 μm, e.g., about 500 nm to about 1 μm, about 1 μm to about 10 μm, about 10 μm to about 50 μm, about 50 μm to about 100 μm, about 100 μm to about 200 μm, about 200 μm to about 300 μm, about 300 μm to about 400 μm, about 400 μm to about 500 μm, about 500 μm to about 1000 μm, or about 1000 μm to about 2000 μm. Without being bound by theory a spacing of about 50 μm to about 200 μm can allow a vibration to bend the nanoribbon network 102 and the polymer 104 located above the aperture of the frame, producing a resistance change in the nanoribbon network 102 due to an increase in the length of the nanoribbon network 102, as described below, which can be detected by measuring the current change between the two or more electrodes, as described below The two or more electrodes can be disposed on the surface of the nanoribbon using thermal evaporation. In some aspects, the thermal evaporation can include evaporating a target electrode material under vacuum using a current of about 10 Å to about 25 A, e.g., about 10 A to about 24 A, about 15 A to about 23 A, or about 18 A to about 21 A. In some aspects, the target electrode material can include silver. In some aspects, the current is passed through an alumina-coated basket heater filled with the target electrode material, e.g., silver. The deposition rate of the thermal evaporation may be controlled to about 0.01 nm/s to about 1 nm/s, e.g., about 0.01 nm/s to about 0.1 nm/s, about 0.1 nm/s to about 0.5 nm/s, or about 0.5 nm/s to about 1 nm/s. For example, the thermal evaporation deposition rate can be about 0.1 nm/s. In some aspects, the deposition may be controlled to provide a thickness of about 25 nm to about 80 nm, e.g. about 25 nm to about 70 nm, about 30 nm to about 60 nm, or about 40 nm to about 55 nm.

Figures 4A, 4B, 4C, 4D:
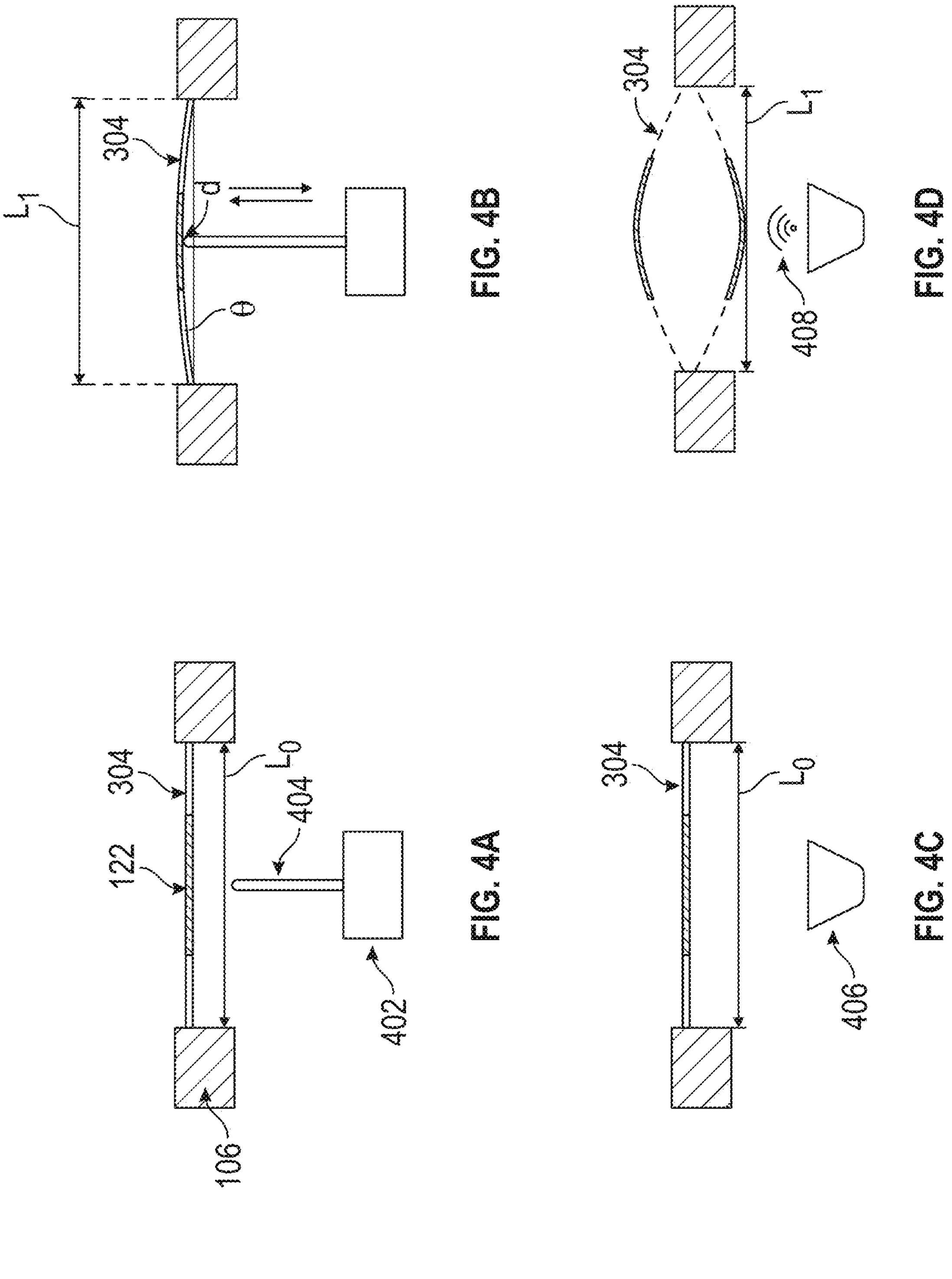
FIGS. 4A-4C are diagrammatic representations of a contact and contactless method of vibration generation, according to at least one aspect of the present disclosure.
FIG. 4D is a bent state of a vibration sensor operating in a non-contact mode.

In some aspects, the vibration sensor 100 can operate in a contact mode and/or a non-contact mode. When operating in contact mode, an oscillator 402 can be disposed proximal to the aperture of the frame 106 such that a moveable element 404, e.g., a probe, rod, piston, and/or other suitable device capable of applying a physical force can bend the film 304, as shown in FIG. 4A. The oscillator 402 can be mechanically coupled to the moveable element 404, in which the oscillator 402 can oscillate the moveable element at a frequency of about 0.1 Hz to about 3000 Hz, e.g., about 0.1 Hz to about 1 Hz, about 1 Hz to about 10 Hz, about 10 Hz to about 100 Hz, about 100 Hz to about 1000 Hz, or about 1000 Hz to about 3000 Hz. In operation, and as shown in FIG. 4A, the film 304 may be in a flat state, in which the film 304 is substantially flat and/or not bent. As shown in FIG. 4B, the oscillator 402 can oscillate the moveable element 404 such that a physical force bends the film 304 to provide an angle (θ) relative to the flat state of about 1° to about 60°, e.g., about 1° to about 50°, about 1° to about 30°, about 1° to about 20°, or about 1° to about 5°. Without being bound by theory, an increased angle can indicate a larger amplitude and/or force that is acting on the film 304.

When operating in non-contact mode, an sound emitter 406 can be disposed proximal to the aperture of the frame such that an audio signal 408 emitted and/or produced from the sound emitter can bend the film 304, as shown in FIG. 4C. As shown in FIG. 4C, the film 304 may be in a flat state, in which the film 304 is substantially flat and/or not bent. As shown in FIG. 4D the sound emitter 406 can emit the audio signal 408 to bend the film 304 according to one or more frequencies, e.g., about 0.1 Hz to about 100 kHz, such as about 0.1 Hz to about 1 Hz, about 1 Hz to about 10 Hz, about 10 Hz to about 100 Hz, about 100 Hz to about 1000 Hz, about 1000 Hz to about 3000 Hz, about 3000 Hz to about 10 kHz, or about 10 kHz to about 100 kHz. In some aspects, the audio signal 408 can bend the film 304 to provide an angle relative to the flat state of about 1° to about 60°, e.g., about 1° to about 50°, about 1° to about 30°, about 1° to about 20°, or about 1° to about 5°. Without being bound by theory, an increased angle can indicate a larger amplitude and/or force that is acting on the film 304.

Figure 5:
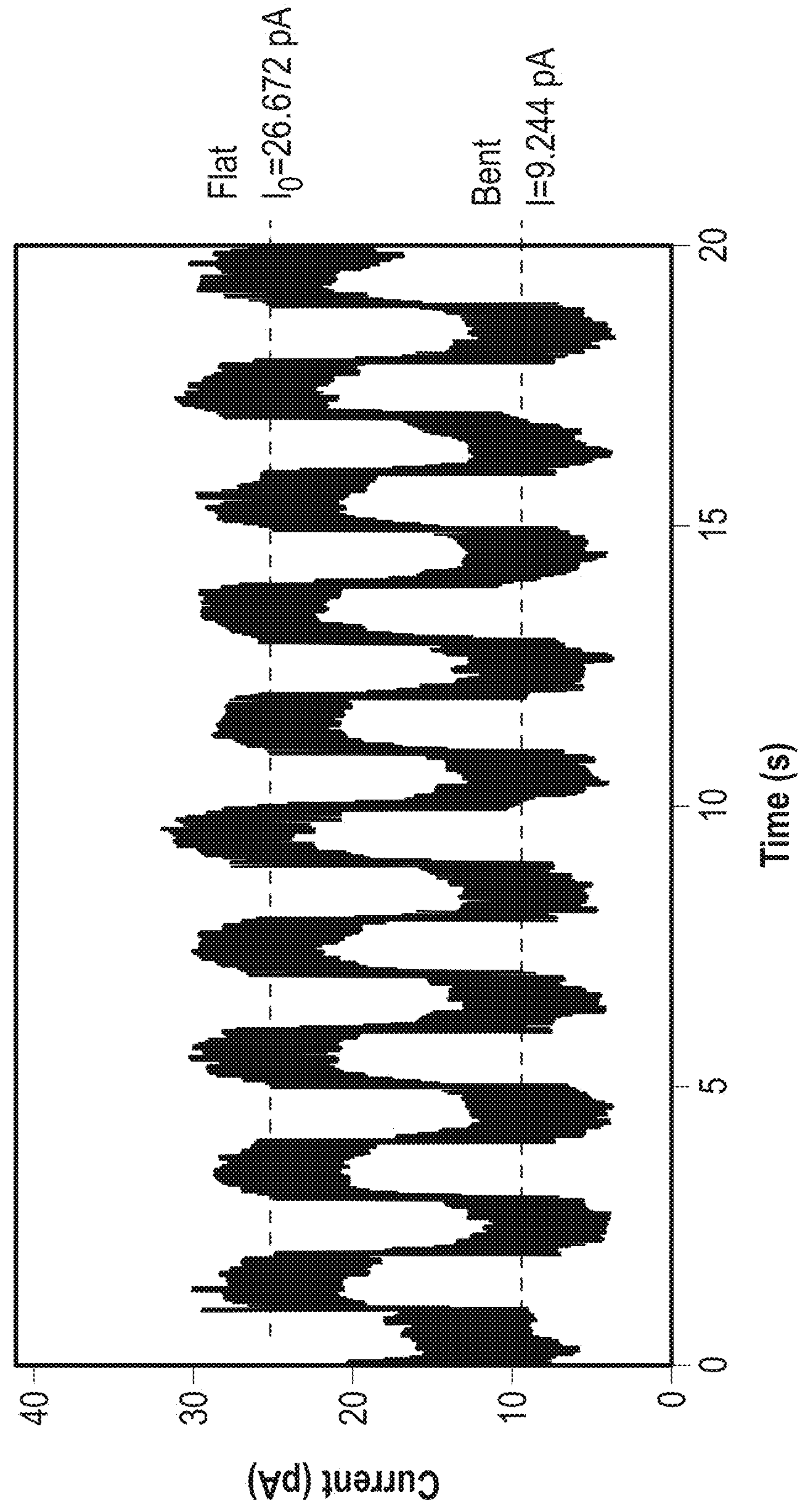
FIG. 5 is a graph illustrating exemplary data of a current over time spectra for an 8 mm vibration sensor, according to at least one aspect of the present disclosure.

In some aspects, a change in the angle of the film 304 can vary one or more resistances of the film 304, thereby modifying a current detected using the two or more electrodes 108, as shown in FIG. 5. For example, when in the flat state the film 304 can include a first length, $L_0$, and when in the bent state the film 304 can include a second length $L_1$, where the second length may be determined by a total displacement (d) of the film 304 along an axis using a laser displacement sensor, e.g., a laser displacement sensor can include an IDS3010 displacement sensor provided by Attocube Systems AG of Haar, Germany. The first length $L_0$, can be about 4 mm to about 10 mm, e.g., about 8 mm. The second length, $L_1$, can be determined by the displacement d and angle θ. $\theta=\tan^{-1}(2d/L_0)$, $L_1=L_0/\cos(\theta)=L_0/\cos(\tan^{-1}(2d/L_0))$. Given $L_0$=8 mm, and the d could be about 0.07 mm to about 1.5 mm, e.g., about 0.1 mm to about 1 mm, about 0.2 mm to about 0.5 mm, or about 0.3 mm to about 0.4 mm, $L_1$ could be about 8.001 mm to about 8.544 mm, e.g., about 8.003 mm to about 8.246 mm, about 8.01 mm to 8.062 mm, or about 8.022 mm to about 8.04 mm.

A difference, ΔL, of the first length and the second length can be determined between the first length and the second length. A first current, $I_0$, and a second current, I, can be measured between the two or more electrodes for the first length, $L_0$, and the second length, $L_1$, respectively, as shown in FIG. 5. For example, a first current, $I_0$, along a first length, $L_0$, can be about 10 pA to about 10 nA, e.g., about 30 pA to about 5 nA, about 50 pA to about 1 nA, about 100 pA to about 500 pA, or about 300 pA to about 400 pA. As a further example, the second current, I, along the second length $L_1$, can be about 1 pA to about 5 nA, e.g., about 5 pA to about 2 nA, about 20 pA to about 300 pA, about 30 pA to about 200 pA, or about 50 pA to about 100 pA. In some aspects, the second length $L_1$ is greater than the first length, $L_0$. In some aspects, a greater length of the film 304 introduces a strain that can increase the total resistance of the film 304 by changing the band structure of single atomic layer $MoS_2$. In some aspects, a greater length of the film 304 can decrease a current of the film 304 passing between the two or more electrodes 106. Without being bound by theory, an increase in the total resistance will reduce the current detected by the two or more electrodes 108, thereby indicating a change from a flat state to a bent state.

In some aspects, the vibration sensor may detect the first current, $I_0$, followed by the second current, I, for a period of time, e.g., about 0.0003 seconds(s) to about 10 s, e.g., about 0.001 s to about 2 s, about 0.002 s to about 2 s, about 0.004 s to about 1 s, or about 0.01 s to about 0.2 s. In some aspects, an interval rate, e.g., a rate at which the vibration sensor oscillates from one first current to the next first current, may indicate a frequency detected by the vibration sensor. In some aspects, a Fourier transform can distinguish a first frequency in a plurality of frequencies from a second frequency in the plurality of frequencies by applying a digitizer to the plurality of frequencies. Without being bound by theory, by distinguishing a first frequency from a second frequency, both a range of detected frequencies and a magnitude of detected frequencies may be obtained.

The ratio of the first current and the second current can be divided by the strain, ¿, to obtain the gauge factor (GF) of the vibration sensor 100, where the strain, ε, is the difference, ΔL, divided by the first length $L_0$. In some aspects, the gauge factor of the vibration sensor can include about 50 to about 3000, e.g., about 100 to about 1500, about 1000 to about 2000, about 2000 to about 2500, or about 2500 to about 3000, using a strain of about 0.0001% to about 5%, e.g., about 0.0001% to about 0.001%, about 0.001% to about 0.01%, about 0.01% to about 0.1%, about 0.1% to about 1.0%, or about 1% to about 5%.

EXAMPLES

Example 1

Figure 6A:
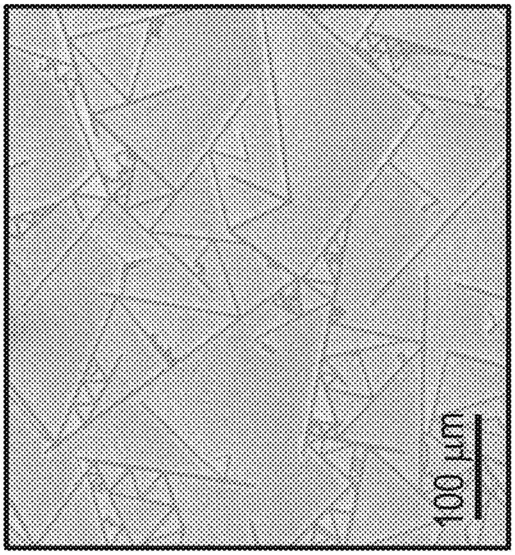
FIGS. 6A-6C are images of a nanoribbon network. According to at least one aspect of the present disclosure.
Figure 6B:
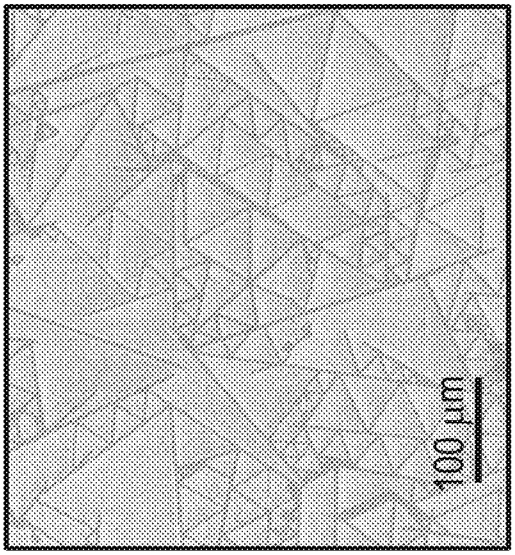
Figure 6C:
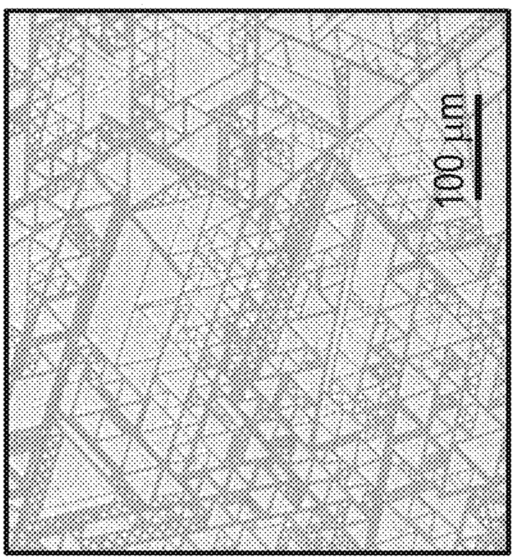
Figure 7:
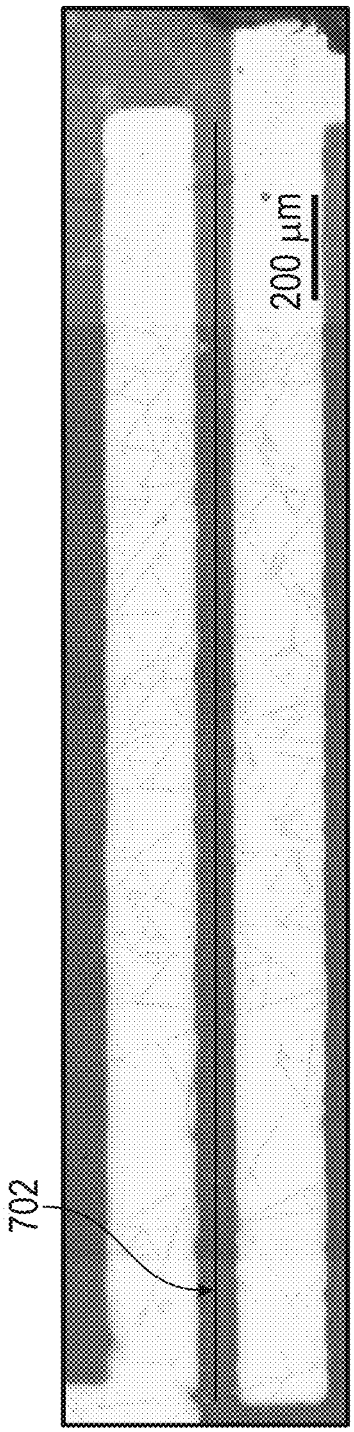
FIG. 7 is an image of a vibration sensor, according to at least one aspect of the present disclosure.

Now referring to FIGS. 6A-6C, images of a nanoribbon network are shown. By adjusting the total weight of precursor mixture of $MoO_2$, NaBr, and Ni the density of the nanoribbon network was adjusted. For example, a total weight of 0.8 mg of the precursor mixture resulted in a relatively low density of nanoribbons in the nanoribbon network. As a further example, a total weight of 1.2 mg of the precursor mixture resulted in a relatively medium density of nanoribbons in the nanoribbon network. As a further example, a total weight of 1.5 mg of the precursor mixture resulted in a relatively high density of nanoribbons in the nanoribbon network.

The density of the nanoribbon network was quantified between two electrodes by drawing a line 702 over the polymer, where the length of the line 702 corresponded to the length of the Ag electrode. The total number of nanoribbons encountered by the line was counted. An average number of nanoribbons encountered by the line 702 was 55 nanoribbons, and the length of the Ag electrode was ~3.3 mm; therefore the nanoribbon density of the device was ~16.8 $mm^{-1}$.

Example 2

Figure 8:
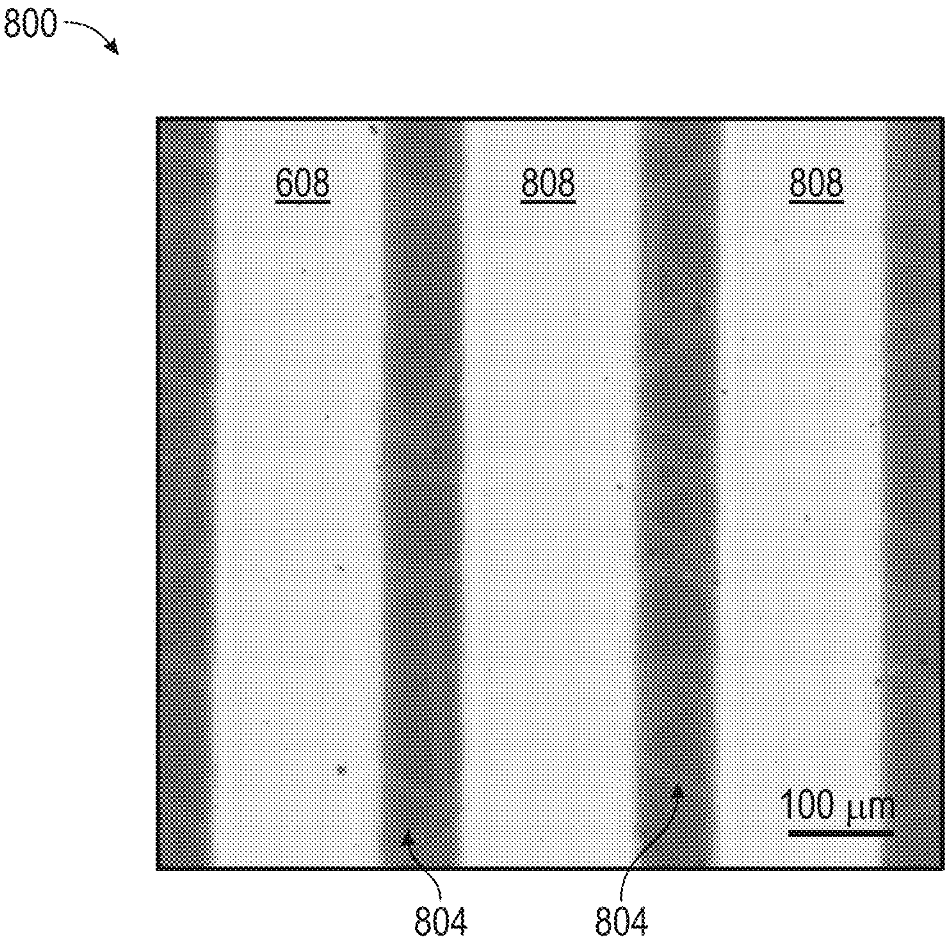
FIG. 8 is an image of a vibration sensor, according to at least one aspect of the present disclosure.
Figure 9:
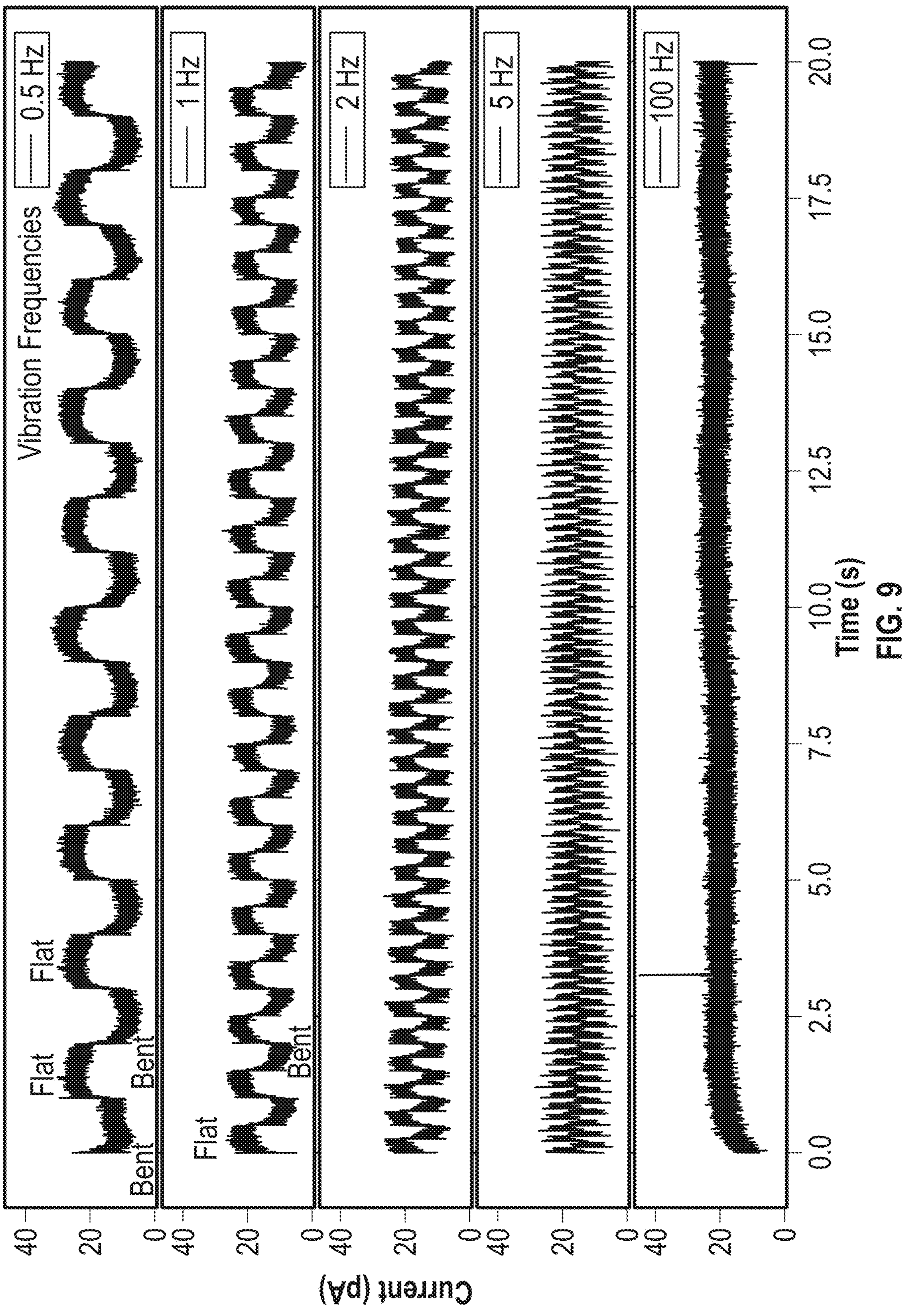
FIG. 9 is a graph illustrating exemplary data of a vibration sensor performance, according to at least one aspect of the present disclosure.

Now referring to FIG. 8, an image of a vibration sensor 800 is shown. The vibration sensor 800 can include any of the vibration sensor 100 of the present disclosure. The vibration sensor 800 included a $MoS_2$ film 804 having three silver electrodes 808 disposed on a surface of the film 804. The three silver electrodes 808 were spaced about 100 μm apart, thereby allowing the film 804 to bend according to one or more moveable elements provided by an oscillator. The oscillator applied a vibration frequency to the film 804 at frequencies of 0.5 Hz, 1 Hz, 2 Hz, 5 Hz, and 100 Hz for a period of 20 seconds, as shown in FIG. 9. The film 804 was able to indicate a current change for each of the 0.5 Hz, 1 Hz, 2 Hz, 5 Hz, and 100 Hz frequencies, thereby allowing for a vibration sensor to detect across a broad range of frequencies using a single sensor.

Figure 10A:
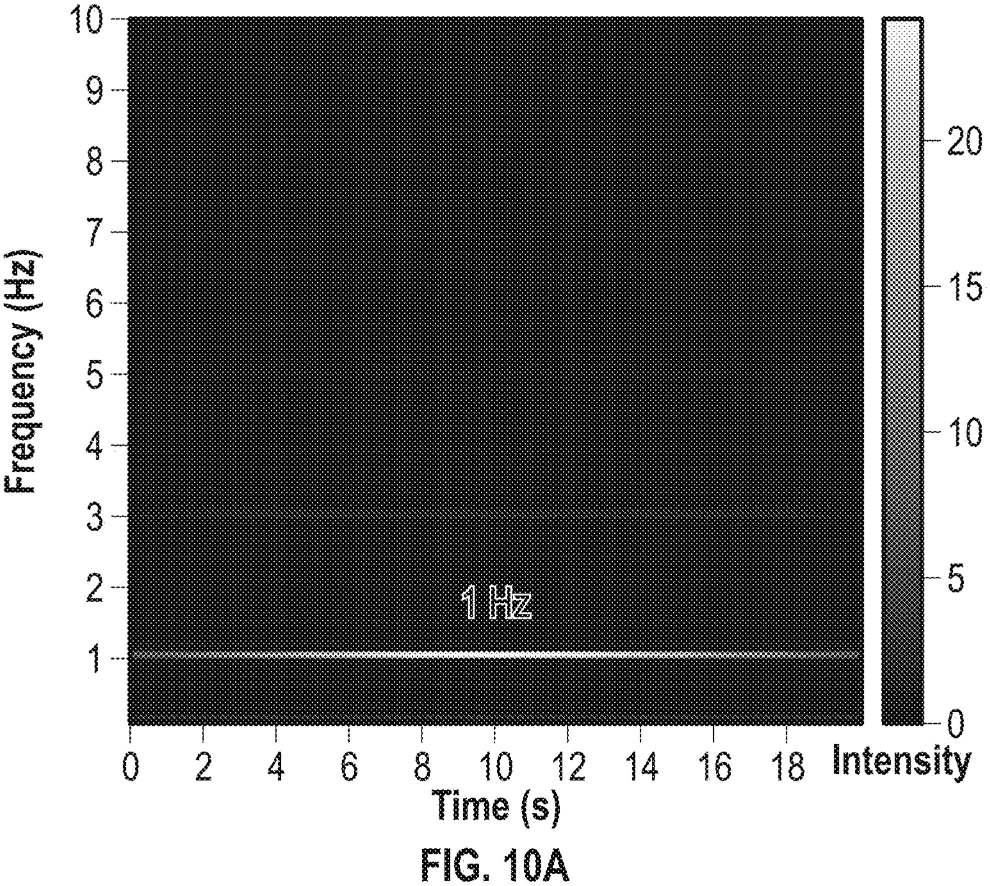
FIGS. 10A and 10B are graphs illustrating exemplary data of frequency domain results using a Fourier Transformer according to at least one aspect of the present disclosure.
Figure 10B:
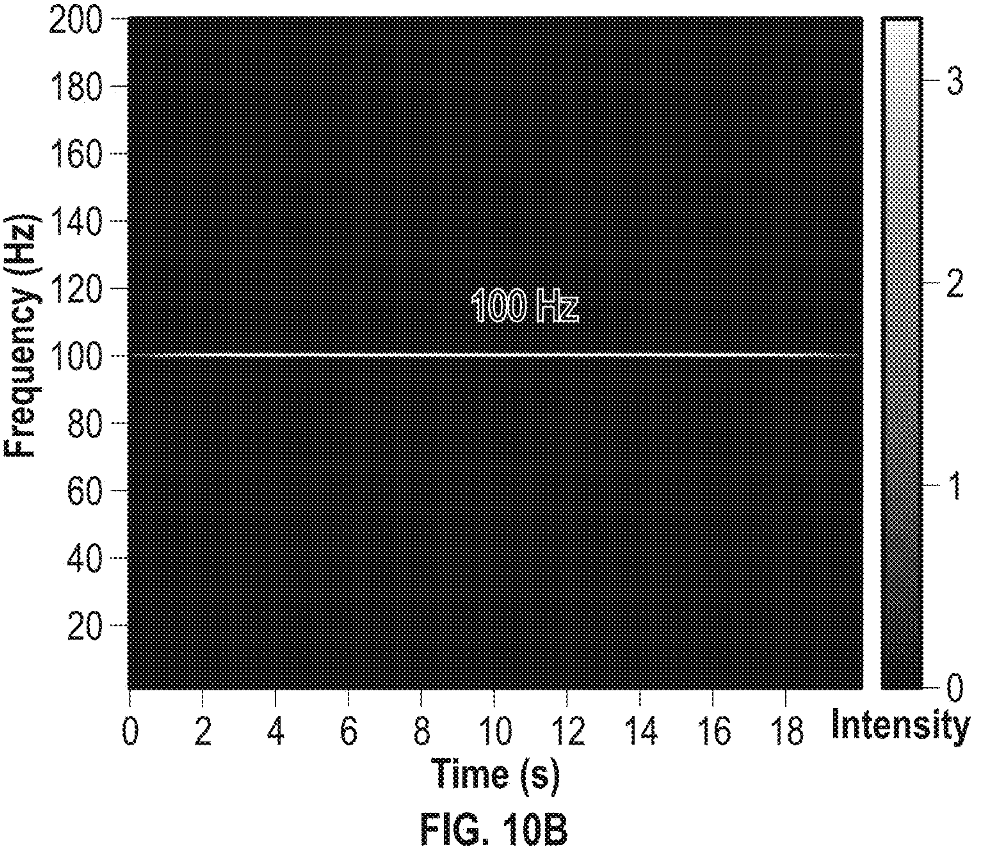

Frequency domain results were obtained by using a digitizer to perform a Fourier transform for each of the 1 Hz (FIG. 10A) and 100 Hz (FIG. 10B) frequencies of FIG. 9, as shown in FIGS. 10A and 10B. The frequency domain results showed that the vibration sensor could accurately sense the vibration at specified frequencies, e.g., 1 Hz and/or 100 Hz. Without being bound by theory, the ability to sense vibrations at specific frequencies can allow for differentiation between varying frequencies among one sample, thereby allowing for the use of a single sensor.

Overall, aspects of the present disclosure generally relate to vibration sensors and methods thereof. Vibration sensors of the present disclosure can detect and differentiate vibration signals from breath, voice, and lung sound, thereby producing simultaneous and continuous measurements associated with breathing parameters, vocal signals, and lung sounds to monitor the human health state of the respiratory system. A vibration sensor of the present disclosure can include an atomically thin nanoribbon (NR) network (NRNT) disposed on a polymer to provide an overall thickness of less than 10 μm, thereby reducing the size of the device without sacrificing accuracy and/or precision. Moreover, the NRNT disposed on the polymer can provide a conformal vibration sensor capable of moving, stretching, and/or deforming, while still providing accurate respiratory measurements. The vibration sensor of the present disclosure can provide a gauge factor of up to about 2000 with less than 5% strain due to the piezoresistive properties of the device, providing enhanced sensitivity compared to conventional vibration sensors. A vibration sensor can provide enhanced robustness compared to conventional vibration sensors, thereby providing long-term sensing with bending-unbending cycles upon vibration.

Aspects Listing

The present disclosure provides, among others, the following aspects, each of which can be considered as optionally including any alternate aspects:

Clause 1. A vibration sensor including: a frame including at least an aperture; a polymer including an elastomer disposed on the frame; a nanoribbon network disposed on the polymer; and two or more electrodes disposed on the nanoribbon.

Clause 2. The sensor of clause 1, in which the frame includes: a width of about 1 cm to about 10 cm; and a height of about 100 μm to about 10 cm.

Clause 3. The sensor of clauses 1 or 2, in which the aperture is located within the frame Clause 4. The sensor of any one of clauses 1-3, in which the elastomer includes one or more monomers selected from the group consisting of styrene, a propylene, butylene, ethylene, a diisocyanate, an ester, an amine, and a combination thereof.

Clause 5. The sensor of clause 4, in which the elastomer includes a combination of styrene-ethylene-butadiene-styrene.

Clause 6. The sensor of any one of clauses 1-5, in which the nanoribbon includes a transition metal dichalcogenide.

Clause 7. The sensor of clause 6, in which the transition metal dichalcogenide includes $MoS_2$.

Clause 8. The sensor of any one of clauses 1-7, in which the nanoribbon network includes a lateral ribbon-ribbon junction.

Clause 9. The sensor of any one of clauses 1-8, in which the nanoribbon network includes a stacking ribbon-ribbon junction.

Clause 10. The sensor of any one of clauses 1-9, in which each electrode of the two or more electrodes includes a metal electrode.

Clause 11. The sensor of clause 10, in which the metal electrode is independently selected from the group consisting of indium, bismuth, nickel, gold, titanium, platinum, and silver.

Clause 12. The sensor of clause 11, in which the metal electrode is silver.

Clause 13. The sensor of clause 12, in which the two or more electrodes comprises a spacing of about 1 μm to about 2000 μm.

Clause 14. The sensor of clause 13, wherein the spacing includes about 50 μm to about 200 μm.

Clause 15. A method of producing a vibration sensor, the method including: growing a nanoribbon network on a substrate selected from the group consisting of $SiO_2$, Si, Au, c-sapphire, fluorophlogopite mica (F-mica), $SrTiO_3$, hexagonal boron nitride (h-BN), and combinations thereof; forming a film by depositing a polymer on the nanoribbon; disposing the film on a frame; and disposing two or more electrodes on the film.

Clause 16. The method of clause 15, in which disposing the nanoribbon the substrate includes using a chemical vapor deposition technique including subjecting two or more precursor powders to a moisturized gas flow at a temperature of about 600° C. to about 1000° C.

Clause 17. The method of clause 16, in which the two or more precursor powders are selected from the group including a metal powder, a metal oxide powder, an alkali-metal halide powder, a chalcogen powder, and a combination thereof.

Clause 18. The method of clause 17, in which the disposing the film on the frame includes extracting the film from the substrate by applying an aqueous media to at least one of the film or the substrate.

Clause 19. A method of detecting a frequency, the method including: measuring a first current of a vibration sensor; the vibration sensor including: a frame including at least an aperture; a film including a nanoribbon disposed on a polymer, in which the polymer is disposed on the frame; and two or more electrodes disposed on the nanoribbon; bending the film of a vibration sensor from a first length to a second length; and measuring a second current of the vibration sensor.

Clause 20. The method of clause 19, in which bending the film of the vibration sensor includes displacing the film from a first length to a second length.

Clause 21. The method of clause 18, further including distinguishing a first frequency from a plurality of frequencies from a second frequency in the plurality of frequencies by applying a Fourier transform to the plurality of frequencies.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, for example, the terms "comprising," "consisting essentially of," "consisting of" also include the product of the combinations of elements listed after the term.

The use of headings is for purposes of convenience only and does not limit the scope of the present disclosure.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term "about" when referring to a measurable value such as an amount, a temporal duration, and the like, is meant to encompass variations.

As used herein, the indefinite article "a" or "an" shall mean "at least one" unless specified to the contrary or the context clearly indicates otherwise. For example, aspects comprising "a metal" include aspects comprising one, two, or more metals, unless specified to the contrary or the context clearly indicates only one metal is included.

While the foregoing is directed to aspects of the present disclosure, other and further aspects of the disclosure may be devised without departing from the basic scope thereof, and the scope thereof is determined by the claims that follow.

What is claimed is:

1. A vibration sensor comprising:
- a frame comprising at least an aperture;
- a polymer comprising an elastomer disposed on the frame;
- a nanoribbon network disposed on the polymer; and
- two or more electrodes disposed on the nanoribbon network, wherein the two or more electrodes have a spacing of about 500 nm to about 2000 μm.

2. The sensor of claim 1, wherein the frame has:
- a width of about 1 cm to about 10 cm; and
- a height of about 100 μm to about 10 cm.

3. The sensor of claim 1, wherein the aperture is located within the frame.

4. The sensor of claim 1, wherein the elastomer comprises one or more monomers selected from a group consisting of styrene, a propylene, butylene, ethylene, a diisocyanate, an ester, an amine, or a combination thereof.

5. The sensor of claim 4, wherein the elastomer comprises a combination of styrene-ethylene-butadiene-styrene.

6. The sensor of claim 1, wherein the nanoribbon network comprises a transition metal dichalcogenide.

7. The sensor of claim 6, wherein the transition metal dichalcogenide comprises $MoS_2$.

8. The sensor of claim 1, wherein the nanoribbon network comprises a lateral ribbon-ribbon junction.

9. The sensor of claim 1, wherein the nanoribbon network comprises a stacking ribbon-ribbon junction.

10. The sensor of claim 1, wherein each electrode of the two or more electrodes comprises a metal electrode.

11. The sensor of claim 10, wherein each metal electrode is independently selected from a group consisting of indium, bismuth, nickel, gold, titanium, platinum, or silver.

12. The sensor of claim 11, wherein each metal electrode is silver.

13. The sensor of claim 12, wherein the spacing comprises about 50 μm to about 200 μm.

14. A method of producing a vibration sensor, the method comprising:
- growing a nanoribbon on a substrate selected from a group consisting of $SiO_2$, Si, Au, c-sapphire, fluorophlogopite mica (F-mica), $SrTiO_3$, hexagonal boron nitride (h-BN), or combinations thereof;
- forming a film by depositing a polymer on the nanoribbon;
- disposing the film on a frame; and
- disposing two or more electrodes on the film.

15. The method of claim 14, wherein disposing the nanoribbon the substrate comprises using a chemical vapor deposition technique comprising subjecting two or more precursor powders to a moisturized gas flow at a temperature of about 600° C. to about 1000° C.

16. The method of claim 15, wherein the two or more precursor powders are selected from a group comprising a metal powder, a metal oxide powder, an alkali-metal halide powder, a chalcogen powder, or a combination thereof.

17. The method of claim 16, wherein disposing the film on the frame comprises extracting the film from the substrate by applying an aqueous media to at least one of the film or the substrate.

18. A method of detecting a frequency, the method comprising:
- measuring a first current of a vibration sensor, the vibration sensor comprising:
  - a frame comprising at least an aperture;
  - a film comprising a nanoribbon disposed on a polymer, wherein the polymer is disposed on the frame; and
  - two or more electrodes disposed on the nanoribbon;
- bending the film of a vibration sensor from a first length to a second length; and
- measuring a second current of the vibration sensor.

19. The method of claim 18, wherein bending the film of the vibration sensor comprises displacing the film from a first length to a second length.

20. The method of claim 18, further comprising distinguishing a first frequency from a plurality of frequencies from a second frequency in the plurality of frequencies by applying a Fourier transform to the plurality of frequencies.

* * * * *